May 29, 1923.
J. B. NEIL
COTTON PICKER
Filed April 19, 1920     7 Sheets-Sheet 1
1,456,645
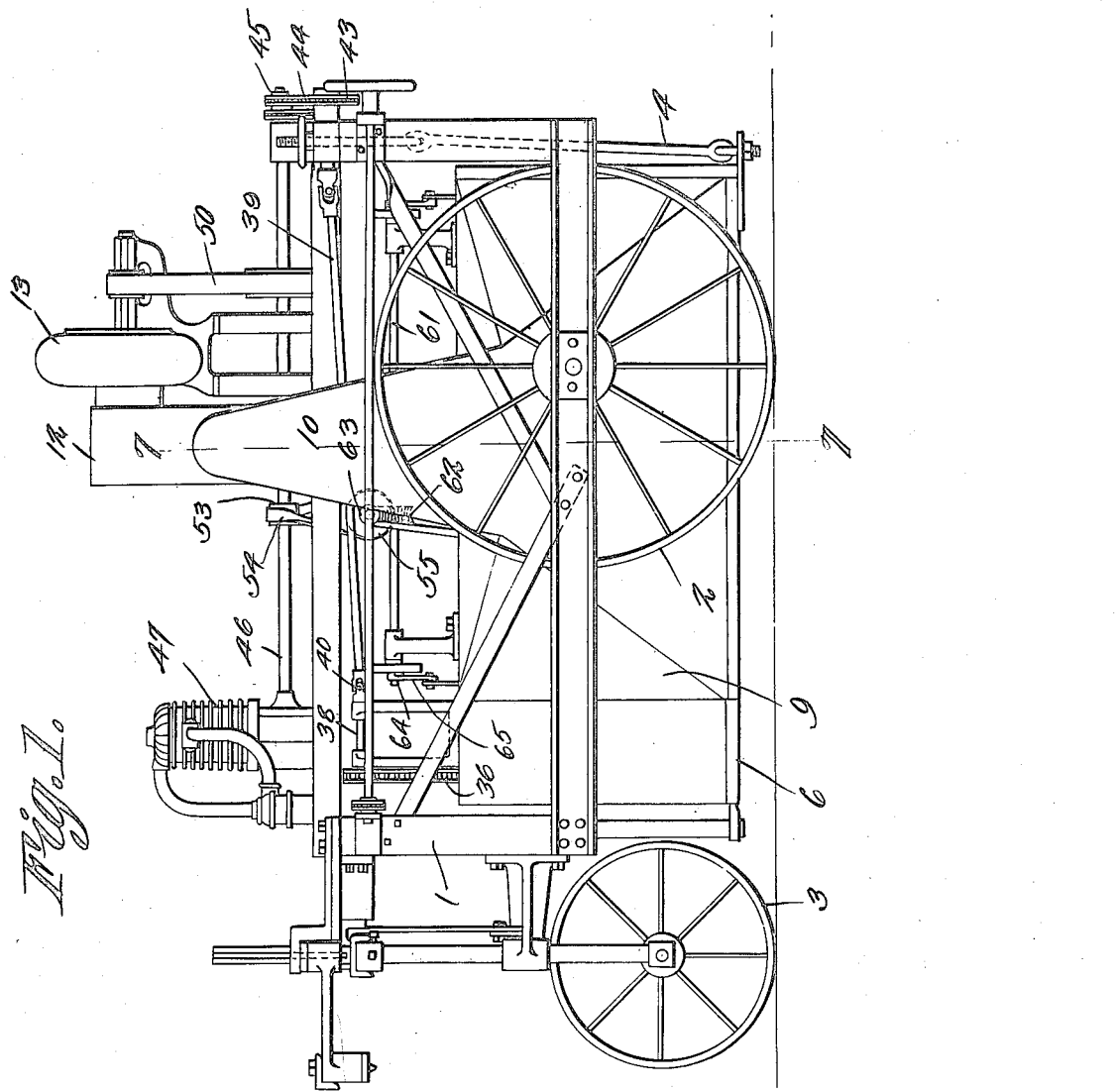

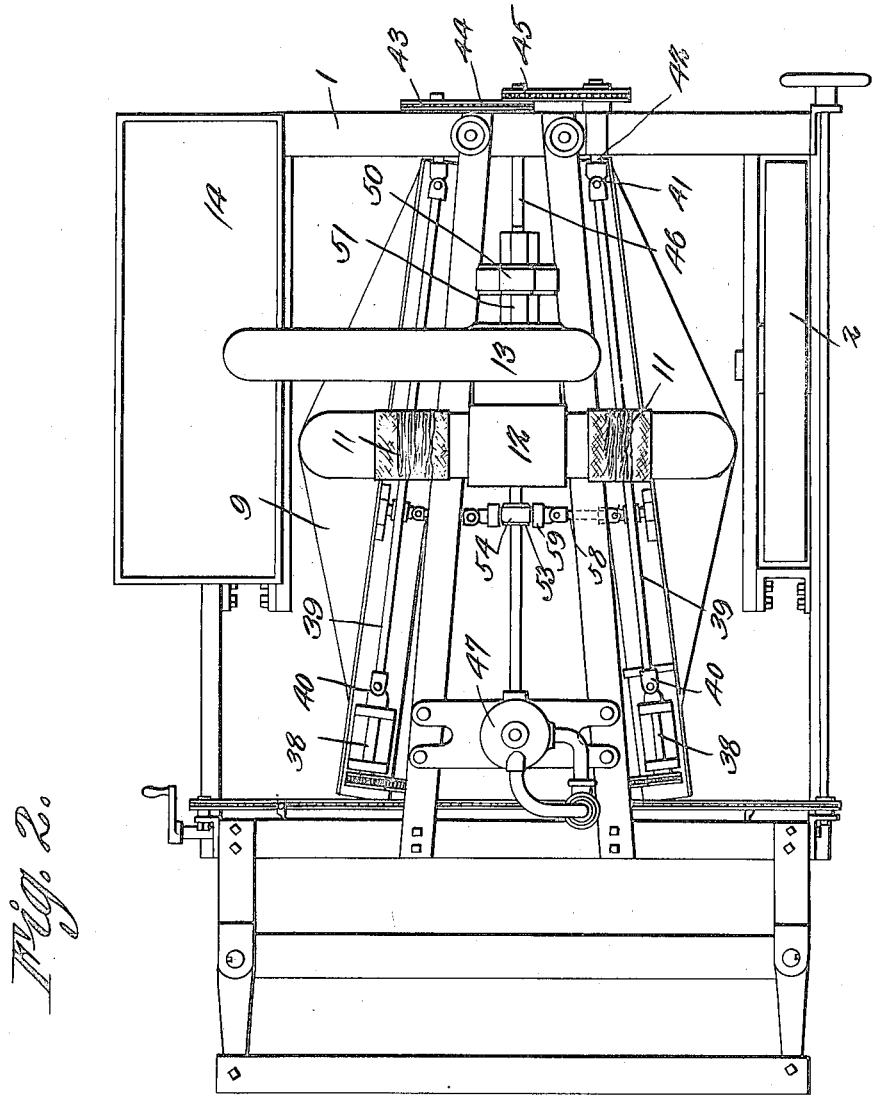

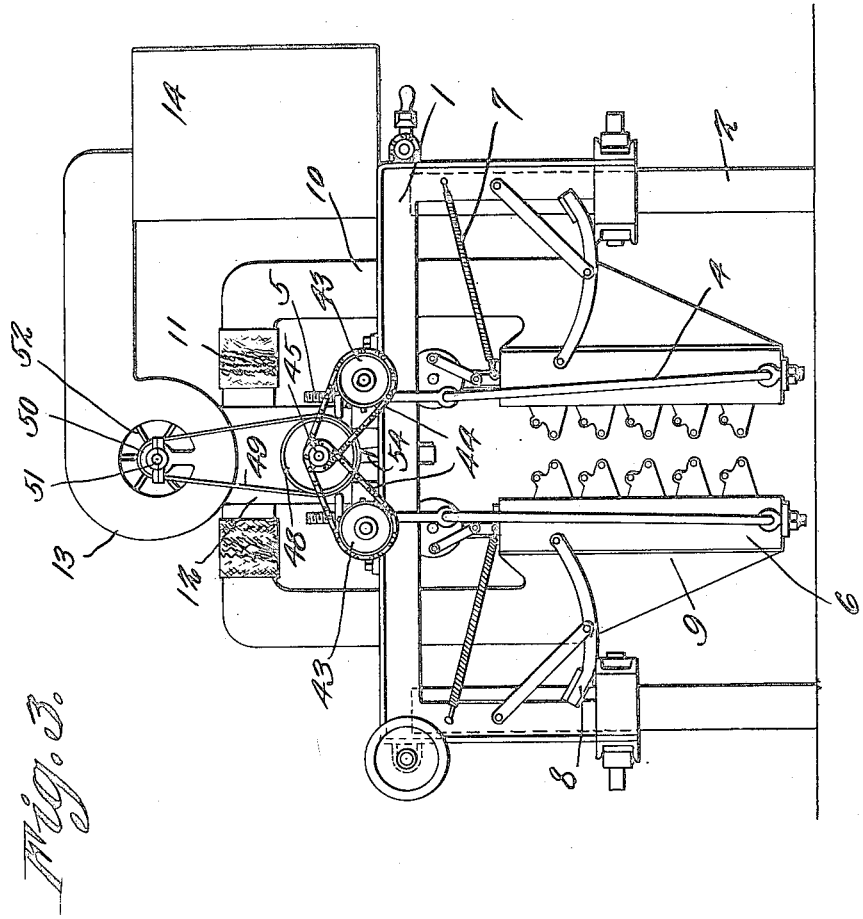

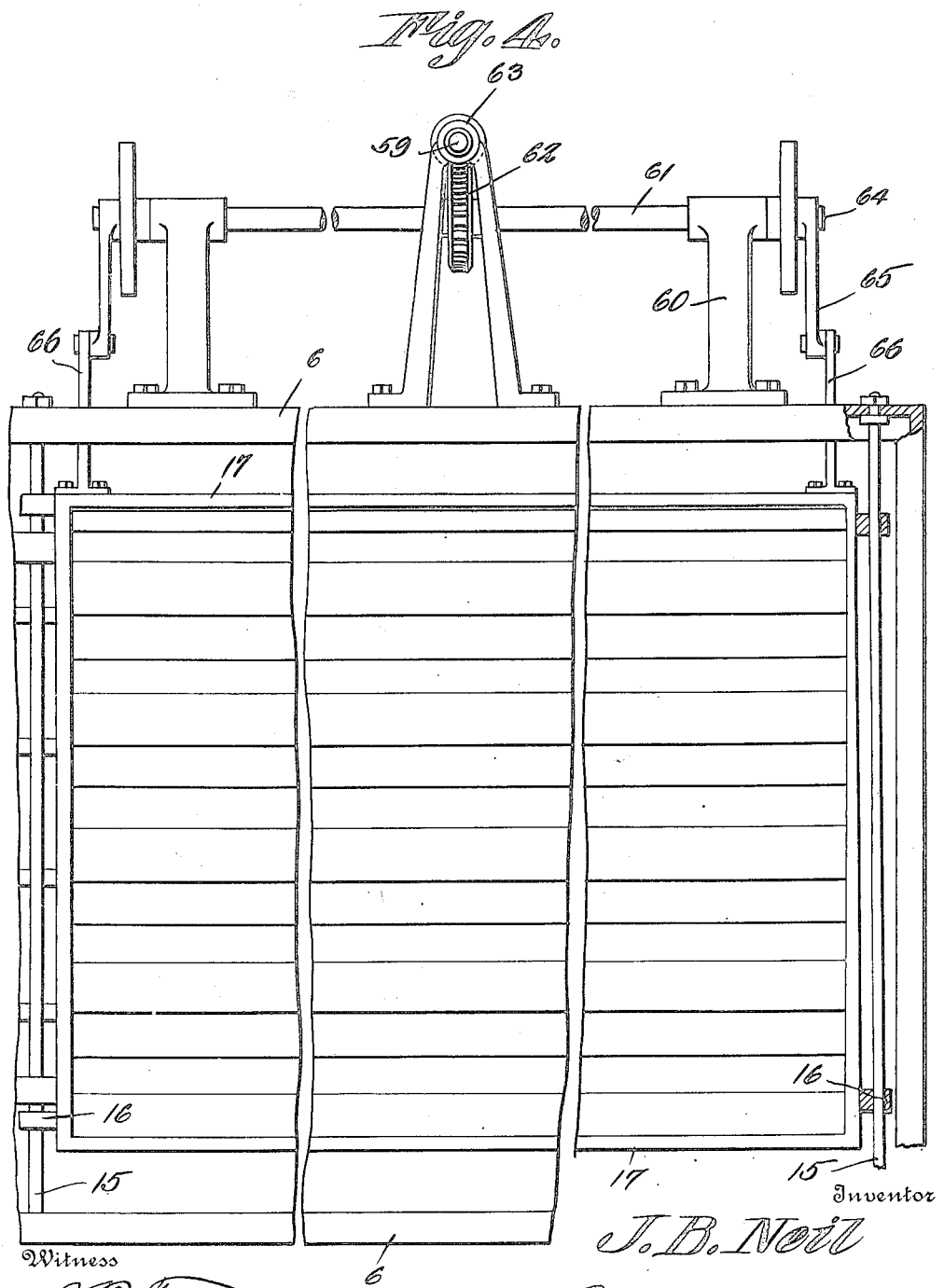

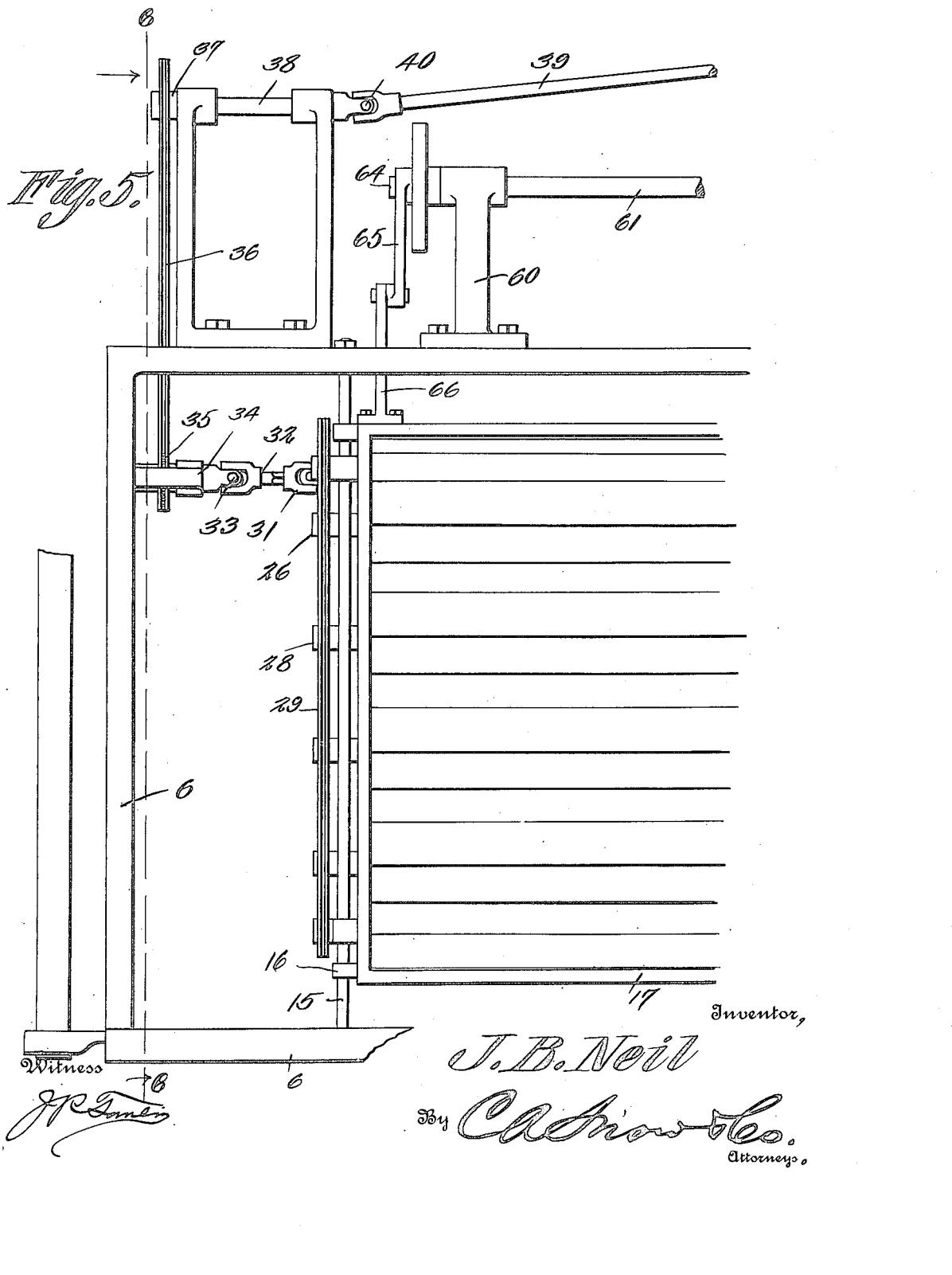

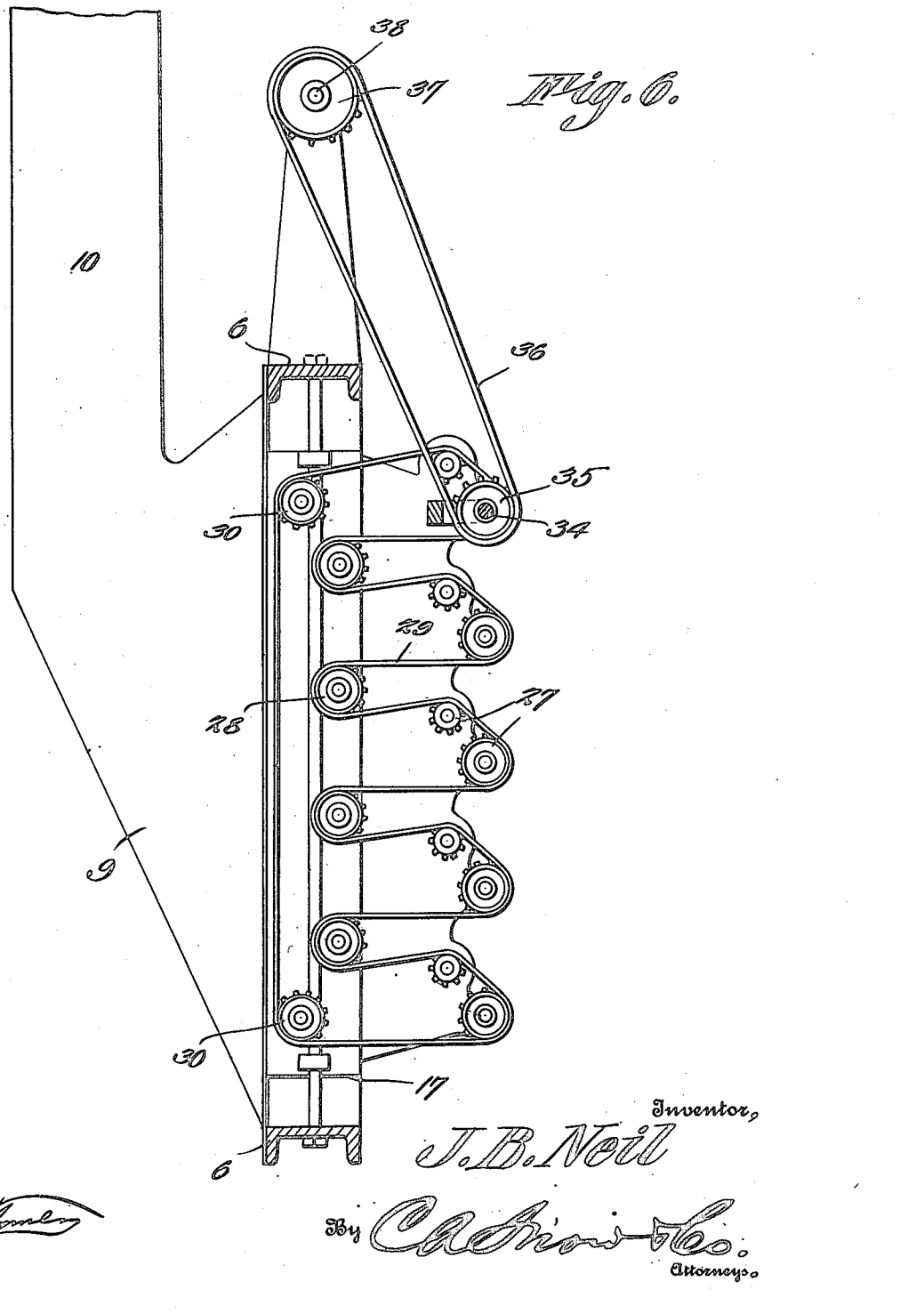

May 29, 1923.
J. B. NEIL
COTTON PICKER
Filed April 19, 1920     7 Sheets—Sheet 7
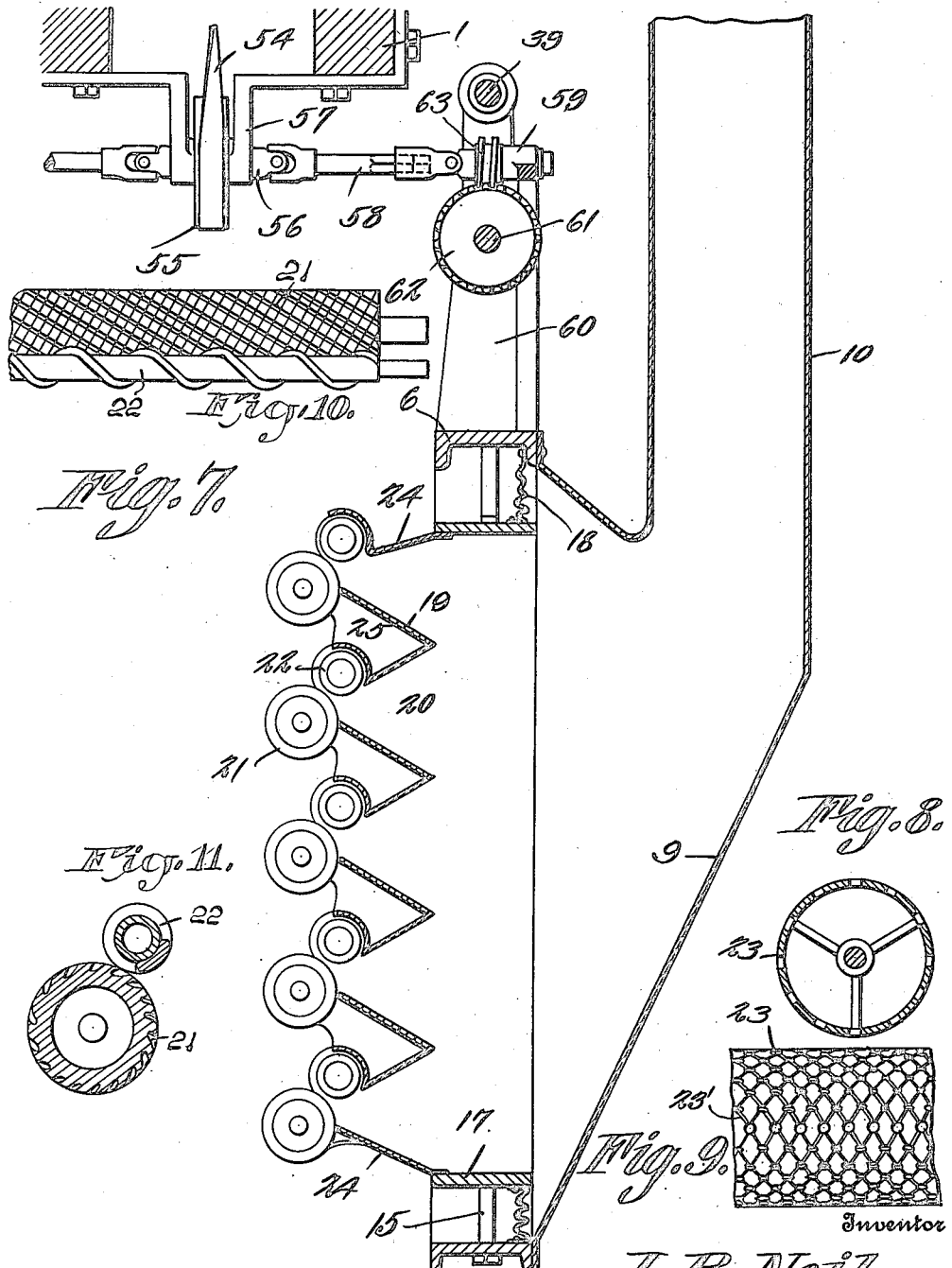

Patented May 29, 1923.

1,456,645

UNITED STATES PATENT OFFICE.

JOSEPH B. NEIL, OF YORK, SOUTH CAROLINA, ASSIGNOR OF ONE-THIRD TO CHARLES L. COBB, OF ROCK HILL, SOUTH CAROLINA, AND ONE-THIRD TO J. C. WILBORN, OF YORK, SOUTH CAROLINA.

COTTON PICKER.

Application filed April 19, 1920. Serial No. 374,951.

*To all whom it may concern:*

Be it known that I, JOSEPH B. NEIL, a citizen of the United States, residing at York, in the county of York and State of South Carolina, have invented a new and useful Cotton Picker, of which the following is a specification.

This invention relates to machines for picking cotton.

One of the objects of the invention is to simplify and otherwise improve upon the structure by eliminating a good bit of the driving mechanism heretofore necessary, thereby materially reducing the weight of the machine; by dispensing with doffing brushes and using in lieu thereof suction for the purpose of stripping cotton from the picking elements; by bodily moving the groups of picking units to obtain the desired brushing or combing action upon the plants during the picking operation; and by reducing the power required to operate the complete machine.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a side elevation of the machine.

Figure 2 is a plan view thereof.

Figure 3 is a rear elevation.

Figure 4 is a view partly in elevation and partly in section of one of the picking groups and adjacent parts, portions being broken away.

Figure 5 is an elevation showing one end portion of one of the picking groups and the mechanism combined therewith.

Figure 6 is a section on line 6—6, Figure 5.

Figure 7 is an enlarged transverse section through one of the picking frames and the parts being combined therewith, said section being taken on the line 7—7, Figure 1, the suction flue being shown in section.

Figure 8 is an enlarged section through a picking roll.

Figure 9 is a face view of a portion of a roll.

Figure 10 is a plan view of a portion of a picking roll and a portion of a spiral roll cooperating therewith.

Figure 11 is a transverse section through the rolls shown in Figure 10.

Referring to the figures by characters of reference 1 designates a supporting structure carried by wheels 2 and 3, this structure being propelled and guided by mechanism such as disclosed in my application hereinbefore mentioned and which constitutes no part of the present invention.

Suspended within the structure 1 by means of rods 4 having screw threaded connecting bolts 5 are frames 6 adapted to travel along opposite sides of a row of plants, these frames being adjustable not only vertically by means of the bolts 5 but being also shiftable laterally toward and from each other, there being springs 7 connecting the structure 1 to the upper portions of the frames 6 and foot operated levers 8 for adjusting the frames.

Each of the frames 6 has a suction hood 9 covering the outer side thereof and the walls of which converge to an upwardly extending flue 10. The upper ends of the flues are inturned and are connected by flexible tubes 11 to a box 12 in communication with the air intake of a blower casing 13. This blower casing discharges into a receptacle 14 carried by the structure 1.

Mounted within each of the frames 6 near the ends thereof are vertically disposed guide rods 15 and slidably mounted on these rods are lugs 16 extending from the ends of a slidable frame 17. The spaces between the upper and lower ends of the frame 17 and the corresponding portions of the frames 6 are closed by flexible strips 18 of fabric or the like so that leakage of air into the hoods 9 through these spaces is prevented.

The inner side of each of the frames 17 is provided with a series of V-shaped partition strips 19 forming suction throats 20 therebetween and journaled on the ends of the frame and extending along the outer ends of these suction throats are picking rolls 21 and spiral rolls 22 arranged in pairs of one each, the spiral rolls 22 being similar to those disclosed in my application hereinbefore mentioned and being arranged above the picking rolls and set back somewhat therefrom away from the plants being acted on. The picking rolls 21 can be of the usual toothed type shown for example in my co-pending application, 337,946, filed Nov. 14, 1919, and illustrated in detail in Figures 10 and 11 of the accompanying drawings. However, if preferred, each roll can be formed of a cylinder the face of which is provided with a plurality of small apertures 23 as shown in Figures 8 and 9.

Top and bottom plates 24 are connected to each frame 17 and serve to complete the upper and lower throats 20.

The outer sides of the V-shaped strips 19 form longitudinal pockets 25 into which the branches of the plants being acted on are free to expand or extend during the picking operation.

Each of the rolls 21 and 22 has its shaft 26 extended forwardly beyond the frame 17 and provided with a sprocket 27. Idler sprockets 28 are mounted on the frames 17 and a continuous drive chain 29 extends in engagement with the sprockets 27 and the idler sprockets 28 (see Figure 6) and also engages supplemental guide sprockets 30 mounted on the frame 17 near the top and bottom thereof. The shaft of the upper picking roll carried by each frame 17 is connected by a universal joint 31, to a telescopic shaft section 32 which, in turn, is connected by a universal joint 33 to a short shaft 34 mounted in bearings carried by the frame 6. A sprocket 35 is secured to the shaft 34 and receives motion through a chain 36 from a sprocket 37 secured to the front section 38 of a jointed transmission shaft. The intermediate section of this transmission shaft has been indicated at 39 and is connected to the shaft 38 by a universal joint 40. This intermediate section is in turn connected by a universal joint 41 to the rear section 42 of the transmission shaft and which section is journaled on the rear portion of the structure 1.

Obviously two transmission shafts are employed, one being provided for each of the frames 6 and the mechanism driven thereby. The rear sections 42 of these two transmission shafts are provided with sprockets 43 receiving motion through chains 44 from sprockets 45 secured to the rear end portion of an engine shaft 46. This engine shaft extends longitudinally of the structure 1 from the motor 47. A pulley 48 is secured to the engine shaft and drives a belt 49 which transmits motion to a small pulley 50 secured to the shaft 51 of the suction fan 52 mounted in the housing 13.

Secured to the shaft 46 is a pulley 53. A belt 54 transmits motion from this pulley to a pulley 55 secured to a transverse shaft 56 journaled in bearings 57 carried by the structure 1. See Figure 7. Shaft 56 has telescopic sections 58 connected thereto by universal joints and also connected to worm shafts 59 journaled in suitable bearings carried by the frames 6. Arranged longitudinally above each frame 6 and mounted in the bearings 60 is a shaft 61 having a worm gear 62 adapted to be rotated by the worm 63 on the shaft section 59. Shaft 61 is provided, at each end, with a crank 64 connected, by a pitman 65, to an arm 66 extending upwardly from the slidable frame 17 thereunder.

It will be apparent that when the machine is in operation it will straddle the row of plants being operated on and will move therealong. Motion will be transmitted to the picking rolls and to the spiral rolls from shafts 38 through the chains 36 and sprockets 35 and 37 and through the chains 29 and the sprockets 27, 28 and 30. The shafts 38, in turn, will be driven by the sections 39 and 42 receiving motion through the chains 44 and sprockets 43 and 45 from the engine shaft 46. As the machine moves along the row the picking rolls will engage the cotton and carry it upwardly to the throats 20 where it will be sucked from the rolls into the hoods 9 and 10 and ultimately discharged into the receiver 14. If the picking rolls are made of perforated cylinders, the flow of air through the rolls will be sufficient to cause the cotton to adhere to the said rolls until the cotton is brought to the throats 20 whereupon it will be stripped from the rolls. The spiral rolls 22 operate to keep the branches of the plants in proper position during the forward movement of the machine and to exert pulls upon the twigs and branches while the cotton is being gripped by the picking rolls. The pockets 25 allow the branches and twigs to expand thereinto, thus to allow the picking rolls to get close up to the stalks of the plants. As the machine advances the frames 17 will be bodily reciprocated upwardly and downwardly so that the picking units made up of the rolls 21 and 22 will thus brush up and downwardly upon the plants, thereby insuring the collection of practically all of the cotton fiber upon the plants. Obviously the reciprocation of the movable picking frames 17 and the units carried thereby will be set up by the shaft 61 and the parts connected thereto, driven by the worms 63 and gears 62 from the shaft 56 through belts 54. It is designed preferably to mount the frames 17 so that they will move in opposite directions simultaneously whereby each frame will counter balance the other and the power required for operating the two frames will thus be reduced to the minimum.

By referring to Figure 9 it will be noted that intersecting spiral grooves are formed in the picking roll and are indicated at 23′. The apertures pass through these grooves at their points of intersection so that picking points are thus provided where the grooves come together and these points constitute teeth which materially facilitate the picking operation.

What is claimed is:

1. A cotton picking machine including opposed frames mounted for up and down right line movement, means for actuating the frames, and a plurality of picking units carried by each of the frames.

2. A cotton picking machine including opposed frames, means for reciprocating the frames upwardly and downwardly, and a plurality of superposed picking units carried by each of the frames, each unit comprising a picking roll and a spiral roll.

3. A cotton picking machine including movably supported frames, means for reciprocating the frames upwardly and downwardly, a plurality of picking units carried by and superposed within each of the frames, each unit comprising a picking roll and a spiral roll, a suction throat extending from each of the picking units, there being a longitudinal branch receiving pocket between every two adjoining throats, and means for setting up a suction from the picking units and through the throats.

4. In a cotton picking machine the combination with a frame, means for reciprocating the frame, and superposed picking units carried by said frame, each unit including a picking roll and a spiral roll, of suction throats extending from each of the picking units and forming branch receiving pockets therebetween and extending longitudinally of the frame, a stationary suction hood in communication with the suction throats, means for setting up a suction through the hood from the throats and picking units during the reciprocation of the frame and units, and means for actuating the picking units during their reciprocation.

5. A cotton picking machine including a plurality of superposed picking units, a vertically reciprocating frame carrying the same, suction throats extending from the picking units and carried by the frame, there being longitudinal branch receiving pockets formed between the picking units and throats and extending throughout the length of the units, a suction hood, and means for setting up a suction through the hood from the throats and picking units during the reciprocation of the frame.

6. A cotton picking machine including a movably supported structure having spaced frames, a frame mounted for up and down reciprocation within each of said spaced frames, means for actuating said reciprocating frames, suction throats extending from each of the reciprocating frames and disposed in superposed relation, a picking unit at the outer end of each of the suction throats, there being longitudinal branch receiving pockets formed between the throats and opening between the picking units, a suction hood connected to each of the spaced frames, means for setting up a suction through the throats from the picking units and into the hoods, and flexible means for sealing the spaces between the reciprocating frames and the frames in which they are mounted.

7. In a cotton picking machine the combination with spaced frames, and guides within the frames, of frames mounted to reciprocate upon the guides, suction throats extending longitudinally of and outwardly from the reciprocating frames and forming branch receiving pockets therebetween, picking units at the outer ends of said throats, means for actuating the reciprocating frames upon their guides, suction hoods connected to the spaced frames, means for setting up a suction from the picking units through the throats and into the hoods, and flexible means for sealing the spaces between the reciprocating frames and the frames in which they are mounted.

8. In a cotton picking machine a picking roll comprising a hollow cylinder having intersecting spiral grooves in the outer surface thereof, there being a plurality of apertures in the periphery of the cylinder at the points of intersection of the grooves and forming teeth at the apertures and between the grooves.

9. A cotton picking machine including opposed picking units, and means for imparting up and down right line movement to said units simultaneously during the forward movement of the machine.

10. A cotton picking machine including opposed picking elements mounted for rotation about individual axes, and means for imparting right line up and down movement to said elements during such rotation.

11. A cotton picking machine including opposed series of picking elements, the elements of each series being superposed, means for simultaneously rotating said elements about individual axes extending substantially in the direction of movement of the machine, and means for automatically reciprocating the elements vertically during their rotation.

In testimony that I claim the foregoing as my own, I have hereto affixed my signature in the presence of two witnesses.

JOSEPH B. NEIL.

Witnesses:
B. W. MOIR,
G. C. McCOLVEY.